(12) United States Patent
Hamon et al.

(10) Patent No.: US 11,530,306 B2
(45) Date of Patent: Dec. 20, 2022

(54) FLUOROPOLYMER FILM

(71) Applicants: SOLVAY SA, Brussels (BE); CENTRE NATIONAL DE LA RECHERCHE SCIENTIFIQUE, Paris (FR)

(72) Inventors: Christine Hamon, Bollate (IT); Julio A. Abusleme, Saronno (IT); Aurélie Guyomard-Lack, Saint Lambert la Potherie (IT); Jean Le Bideau, Nantes (FR); Dominique Guyomard, Sautron (FR); Bernard Lestriez, Nantes (FR)

(73) Assignee: SOLVAY SA, Brussels (BE)

( * ) Notice: Subject to any disclaimer, the term of this patent is extended or adjusted under 35 U.S.C. 154(b) by 793 days.

(21) Appl. No.: 16/312,272

(22) PCT Filed: Jun. 1, 2017

(86) PCT No.: PCT/EP2017/063394
§ 371 (c)(1),
(2) Date: Dec. 20, 2018

(87) PCT Pub. No.: WO2017/220312
PCT Pub. Date: Dec. 28, 2017

(65) Prior Publication Data
US 2019/0233599 A1 Aug. 1, 2019

(30) Foreign Application Priority Data
Jun. 20, 2016 (EP) ..................... 16175250

(51) Int. Cl.
*C08J 5/18* (2006.01)
*H01M 10/0565* (2010.01)
*H01M 10/0568* (2010.01)
*H01G 11/52* (2013.01)
*H01M 10/0525* (2010.01)
*C08F 214/22* (2006.01)
*H01G 11/56* (2013.01)
*B32B 27/30* (2006.01)
*B32B 27/32* (2006.01)
*G02F 1/1516* (2019.01)
*H01G 9/00* (2006.01)
*H01G 9/20* (2006.01)
*H01G 11/06* (2013.01)

(52) U.S. Cl.
CPC .............. *C08J 5/18* (2013.01); *B32B 27/304* (2013.01); *B32B 27/322* (2013.01); *G02F 1/15165* (2019.01); *H01G 9/0036* (2013.01); *H01G 9/2009* (2013.01); *H01G 11/52* (2013.01); *H01G 11/56* (2013.01); *H01M 10/0525* (2013.01); *H01M 10/0565* (2013.01); *H01M 10/0568* (2013.01); *C08F 214/225* (2013.01); *C08J 2327/16* (2013.01); *H01G 11/06* (2013.01); *H01M 2300/0025* (2013.01); *H01M 2300/0082* (2013.01); *H01M 2300/0085* (2013.01); *H01M 2300/0091* (2013.01); *Y02E 60/13* (2013.01)

(58) Field of Classification Search
CPC .......... C08J 5/18; C08J 5/2237; H01G 11/52; H01G 11/06; H01M 10/0525; H01M 10/052; Y02E 60/13; Y02E 10/542
See application file for complete search history.

(56) References Cited

U.S. PATENT DOCUMENTS

| | | | |
|---|---|---|---|
| 6,203,944 B1 | 3/2001 | Turner et al. | |
| 2002/0037959 A1* | 3/2002 | Colaianna | C08F 214/262 526/242 |
| 2005/0175898 A1 | 8/2005 | Yong et al. | |
| 2006/0148912 A1 | 7/2006 | Katsurao et al. | |
| 2010/0133482 A1* | 6/2010 | Abusleme | C08J 5/2237 252/511 |
| 2011/0152443 A1 | 6/2011 | Ito et al. | |
| 2015/0140473 A1 | 5/2015 | Abusleme et al. | |
| 2018/0340061 A1* | 11/2018 | Ogata | B32B 27/281 |

FOREIGN PATENT DOCUMENTS

| | | | | |
|---|---|---|---|---|
| DE | 102013221162 A1 | 4/2015 | | |
| EP | 1612809 A1 | 1/2006 | | |
| EP | 2415793 A1 | 2/2012 | | |
| EP | 3211033 A1 | 8/2017 | | |
| GB | 1553050 A | 9/1979 | | |
| WO | 9905744 A1 | 2/1999 | | |
| WO | 0003444 A1 | 1/2000 | | |
| WO | 13136223 A1 | 9/2013 | | |
| WO | WO-2013160240 A1 * | 10/2013 | .......... | H01M 8/1039 |
| WO | 2016063994 A1 | 4/2016 | | |

* cited by examiner

*Primary Examiner* — Jonathan G Jelsma
(74) *Attorney, Agent, or Firm* — Osha Bergman Watanabe & Burton LLP

(57) ABSTRACT

The invention pertains to a process for the manufacture of a fluoropolymer film, to the fluoropolymer film obtainable therefrom and to use of said fluoropolymer film in electrochemical and photo-electrochemical devices.

12 Claims, No Drawings

FLUOROPOLYMER FILM

CROSS REFERENCE TO PREVIOUS APPLICATIONS

This application is a U.S. national stage entry under 35 U.S.C. § 371 of International Application No. PCT/EP2017/063394 filed Jun. 1, 2017, which claims priority to European application No. 16175250.6 filed on Jun. 20 2016. The entire contents of these applications are explicitly incorporated herein by this reference.

TECHNICAL FIELD

The invention pertains to a process for the manufacture of a fluoropolymer film, to the fluoropolymer film obtained therefrom and to use of said fluoropolymer film in electrochemical and photo-electrochemical devices.

BACKGROUND ART

Fluoropolymers, and in particular, vinylidene fluoride polymers, have been used with success in a wide variety of applications including electrochemical applications.

In particular, fluoropolymers are used as raw materials for polymer membranes for use in electrochemical devices such as secondary batteries because of their chemical and thermal aging resistance A metal ion secondary battery is typically formed by assembling a positive electrode, an ion-conducting membrane and a negative electrode. The ion conducting membrane, often referred to as "separator", plays a crucial role in the cell, as it must provide ionic conductivity while ensuring effective separation between the opposite electrodes.

Basically, two types of separators can be used: either porous ones, wherein a solution of an electrolyte in a suitable solvent fills the porosity of the separator, or non-porous ones, which are generally either pure solid polymer electrolytes (i.e. electrolytes dissolved in a high molecular weight polyether host, like PEO and PPO, which acts as solid solvent) or gelled polymer electrolyte systems, which incorporates into a polymer matrix a plasticizer or solvent capable of forming a stable gel within the polymer host matrix and an electrolyte.

Nevertheless, current gelled polymer electrolytes may not incorporate and retain the liquid plasticizer/electrolyte solution in an effective manner because of the poor mechanical properties of the gelled polymer electrolyte and/or might not possess the suitable mechanical properties that are required for effective separation of the electrodes. Therefore, their use in both the manufacturing of the battery and in operations of the same is limited.

SUMMARY OF INVENTION

The inventors have now surprisingly found that it is possible to manufacture ionic conductive fluoropolymer films based on a fluoropolymer and an electrolyte having improved mechanical integrity while exhibiting outstanding ionic conductivity.

The present invention thus provides a process for manufacturing a fluoropolymer film comprising a fluoropolymer composite, said process comprising the following steps:
(i) providing a mixture of:
    at least one fluoropolymer [polymer (F)] having an intrinsic viscosity higher than 1.5 dl/g;
    at least one liquid medium (LM) comprising at least one ionic liquid (IL) and containing at least one electrolytic salt (ES) and, optionally at least one organic solvent (S);
(ii) processing the liquid mixture obtained in step (i) to obtain a film, for example by casting; and
(iii) heating the film obtained in step (ii) at a temperature above 100° C. to obtain a transparent fluoropolymer film.

In another aspect, the present invention provides a fluoropolymer film which is obtainable by the process as defined above.

Thus, the invention further pertains to a fluoropolymer film optically transparent to solar radiation comprising a fluoropolymer composite comprising:
    at least one fluoropolymer [polymer (F)] having an intrinsic viscosity higher than 1.5 dl/g;
    at least one liquid medium (LM) comprising at least one ionic liquid (IL) and containing at least one electrolytic salt (ES).

DESCRIPTION OF EMBODIMENTS

It has been surprisingly found that the fluoropolymer film of the present invention is a self-standing fluoropolymer film that stably comprises and retains the liquid medium incorporated during the process as described above. Such fluoropolymer film exhibits enhanced mechanical integrity and outstanding ionic conductivity, while being advantageously optically transparent to solar radiation.

It has been found that the fluoropolymer film of the present invention advantageously withstands mechanical stresses typical of the final intended use, in particular in electrochemical and photo-electrochemical applications.

The fluoropolymer film of the present invention is advantageously endowed with enhanced flexibility and enhanced elongation at break so as to successfully withstand high pulling or stretching forces without failure.

The flexibility of the fluoropolymer film is a measure of its ability to deform elastically and return to its original shape when the applied stress is removed.

The elongation at break of the fluoropolymer film is a measure of the percentage increase in length that occurs before it breaks under the applied tensile stress.

The fluoropolymer film of the invention is endowed with an elongation at break of at least 100%, preferably at least of 150% and more preferably at least of 200%.

The fluoropolymer film as a measure of the tenacity of the film must have at least a stress at break of 10 MPa, preferably at least of 13 MPa, more preferably at least of 15 MPa.

It has been also found that the fluoropolymer film of the present invention is advantageously optically transparent to solar radiation so that it can be successfully used in photo-electrochemical applications.

Haze, defined as the ratio between the total transmission (TT) and diffuse transmission (DT) at a certain wavelength (e.g. 400 nm) is an important parameter to assess the suitability of polymeric films in applications such as solar cells. The results can be evaluated in terms of percentage of transmitted light (total or diffuse). The higher the TT the higher will be the light reaching the solar cell. Concerning the diffuse light, the lower is the haze value and the lower will be the milky appearance of the PV module and the better its aesthetically acceptance. Haze can be measured for example according to the procedure in ASTM D1003.

Preferably, the haze of the compositions according to the invention is below 40, more preferably below 30, 20 or 10.

By the term "fluoropolymer [polymer (F)]", it is hereby intended to denote a fluoropolymer comprising recurring units derived from at least one ethylenically unsaturated monomer comprising at least one fluorine atom.

The polymer (F) preferably comprises:

(a) at least 60% by moles, preferably at least 75% by moles, more preferably at least 85% by moles of vinylidene fluoride (VDF) of formula I: $CH_2=CF_2$ (I)

(b) optionally, from 0.1% to 15% by moles, preferably from 0.1% to 12% by moles, more preferably from 0.1% to 10% by moles of a fluorinated comonomer chosen among vinylfluoride ($VF_1$), chlorotrifluoroethylene (CTFE), hexafluoropropene (HFP), tetrafluoroethylene (TFE), trifluoroethylene (TrFE), perfluoromethylvinylether (PMVE) and mixtures therefrom; and (c) optionally from 0.05% to 10% by moles, preferably from 0.1% to 7.5% by moles, more preferably from 0.2% to 3.0% by moles of (meth)acrylic monomer (MA) of formula (II) as defined below:

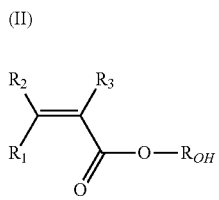

(II)

wherein each of R1, R2, R3, equal or different from each other, is independently a hydrogen atom or a $C_1$-$C_3$ hydrocarbon group, and $R_{OH}$ is a hydrogen or a $C_1$-$C_5$ hydrocarbon moiety comprising at least one hydroxyl group.

Polymer (F) can be semi-crystalline. The term semi-crystalline is intended to denote a polymer (F) which possesses a detectable melting point. It is generally understood that a semi-crystalline polymer (F) possesses a heat of fusion determined according to ASTM D 3418 of advantageously at least 0.4 J/g, preferably of at least 0.5 J/g, more preferably of at least 1 J/g.

The term "liquid medium (LM)" is hereby intended to denote a medium which exists in the liquid state at 20° C. under atmospheric pressure.

The term "ionic liquid (IL)" it is hereby intended to denote a substance formed by the combination of positively charged cations and negatively charged anions, which exists in the liquid state at temperatures below 100° C. under atmospheric pressure.

The ionic liquid (IL) is typically selected from protic ionic liquid ($IL_p$) and aprotic ionic liquids ($IL_a$).

By the term "protic ionic liquid ($IL_p$)", it is hereby intended to denote an ionic liquid wherein the cation comprises one or more $H^+$ hydrogen ions.

Non-limitative examples of cations comprising one or more $H^+$ hydrogen ions include, notably, imidazolium, pyridinium, pyrrolidinium or piperidinium rings, wherein the nitrogen atom carrying the positive charge is bound to a $H^+$ hydrogen ion.

By the term "aprotic ionic liquid ($IL_a$)", it is hereby intended to denote an ionic liquid wherein the cation is free from $H^+$ hydrogen ions.

The liquid medium typically consists essentially, i.e. comprises at least 95 or 99 to 100% by weight, of at least one ionic liquid (IL) and, optionally, at least one additive (A), wherein said ionic liquid (IL) is selected from protic ionic liquids ($IL_p$), aprotic ionic liquids ($IL_a$) and mixtures thereof.

The ionic liquid (IL) is typically selected from those comprising as cation a sulfonium ion or an imidazolium, pyridinium, pyrrolidinium or piperidinium ring, said ring being optionally substituted on the nitrogen atom, in particular by one or more alkyl groups with 1 to 8 carbon atoms, and on the carbon atoms, in particular by one or more alkyl groups with 1 to 30 carbon atoms.

Within the meaning of the present invention, the term "alkyl group" indicates saturated hydrocarbon chains or those carrying one or more double bonds and containing 1 to 30 carbon atoms, advantageously 1 to 18 carbon atoms and even more advantageously 1 to 8 carbon atoms. There can be mentioned by way of example the methyl, ethyl, propyl, iso-propyl, n-butyl, isobutyl, sec-butyl, t-butyl, pentyl, isopentyl, 2,2-dimethyl-propyl, hexyl, 2,3-dimethyl-2-butyl, heptyl, 2,2-dimethyl-3-pentyl, 2-methyl-2-hexyl, octyl, 4-methyl-3-heptyl, nonyl, decyl, undecyl and dodecyl groups.

In an advantageous embodiment of the present invention, the cation of the ionic liquid (IL) is selected from the followings:

a pyrrolidinium ring of formula (III) here below:

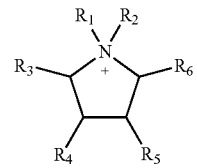

(III)

wherein $R_1$ and $R_2$ each represent independently an alkyl group with 1 to 8 carbon atoms and $R_3$, $R_4$, $R_5$ and $R_6$ each represent independently a hydrogen atom or an alkyl group with 1 to 30 carbon atoms, advantageously 1 to 18 carbon atoms, also more advantageously 1 to 8 carbon atoms, and a piperidinium ring of formula (IV) here below:

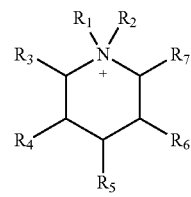

(IV)

wherein $R_1$ and $R_2$ each represent independently of each other an alkyl group with 1 to 8 carbon atoms and $R_3$ to $R_7$ each represent independently of each other a hydrogen atom or an alkyl group with 1 to 30 carbon atoms, advantageously 1 to 18 carbon atoms, even more advantageously 1 to 8 carbon atoms.

In a particularly advantageous embodiment of the present invention, the cation of the ionic liquid (IL) is selected from the followings:

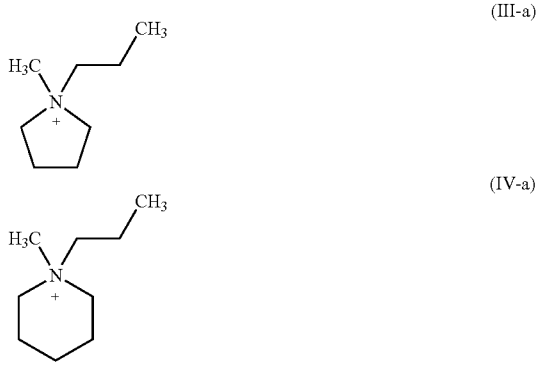

The ionic liquid (IL) is advantageously selected from those comprising as anion those chosen from halides anions, perfluorinated anions and borates.

The halide anions are in particular selected from the following anions: chloride, bromide, fluoride or iodide.

In a particularly advantageous embodiment of the present invention, the anion of the ionic liquid (IL) is selected from the followings:
bis(trifluoromethylsulphonyl)imide of formula $(SO_2CF_3)_2N^-$,
hexafluorophosphate of formula $PF_6^-$,
tetrafluoroborate of formula $BF_4^-$, and
oxaloborate of formula:

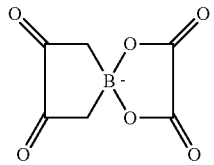

The amount of one or more ionic liquids (IL) in the liquid medium used in the process of the invention is such that the mixture of step (i) comprises advantageously at least 1% by weight, preferably at least 5% by weight, more preferably at least 10% by weight of ionic liquids (IL) based on the total weight of the polymer (F) and the ionic liquid (IL) in said mixture.

The amount of one or more ionic liquids (IL) in the liquid medium used in the process of the invention is such that the mixture of step (i) comprises advantageously at most 95% by weight, preferably at most 85% by weight, more preferably at most 75% by weight of ionic liquids (IL) based on the total weight of the polymer (F) and the ionic liquid (IL) in said mixture.

By the term "electrolytic salt (ES)", it is hereby intended to denote a metal salt comprising electrically conductive ions.

A variety of metal salts may be employed as electrolytic salts (ES). Metal salts which are stable and soluble in the chosen ionic liquid (IL) medium are generally used.

Non-limitative examples of suitable electrolytic salts (ES) include, notably, MeI, $Me(PF_6)_n$, $Me(BF_4)_n$, $Me(ClO_4)_n$, Me(bis(oxalato)borate)$_n$ ("Me(BOB)$_n$"), $MeCF_3SO_3$, $Me[N(CF_3SO_2)_2]_n$, $Me[N(C_2F_5SO_2)_2]_n$, $Me[N(CF_3SO_2)(R_FSO_2)]_n$ with $R_F$ being $C_2F_5$, $C_4F_9$, $CF_3OCF_2CF_2$, $Me(AsF_6)_n$, $Me[C(CF_3SO_2)_3]_n$, $Me_2S_n$, wherein Me is a metal, preferably a transition metal, an alkaline metal or an alkaline-earth metal, more preferably Me being Li, Na, K, Cs, and n is the valence of said metal, typically n being 1 or 2.

Preferred electrolytic salts (ES) are selected from the followings: LiI, $LiPF_6$, $LiBF_4$, $LiClO_4$, lithium bis(oxalato) borate ("LiBOB"), $LiCF_3SO_3$, $LiN(CF_3SO_2)_2$, $LiN(C_2F_5SO_2)_2$, $M[N(CF_3SO_2)(R_FSO_2)]_n$ with $R_F$ being $C_2F_5$, $C_4F_9$, $CF_3OCF_2CF_2$, $LiAsF_6$, $LiC(CF_3SO_2)_3$, $Li_2S_n$ and combinations thereof.

The mixture of step (i) of the process of the invention may optionally comprise one or more organic solvents (S), that are liquid substances which solubilize at least partially the fluoropolymer (F).

Should one or more organic solvents (S) be present, the organic solvent (S) is generally selected from the group consisting of ketones, including lower ketones such as acetone, methylethylketone and higher ketones, such as isophorone, methyl isobutyl ketone (MIK), cyclohexanone, diisobutyl ketone; amides such as N,N-dimethylformamide (DMF), N,N-dimethylacetamide, tetramethyl urea; polar aprotic solvents comprising oxygen and/or nitrogen heteroatom(s), such as dimethylsulfoxide (DMSO), tetrahydrofuran (THF), N-methyl-2-pyrrolidone (NMP); organic phosphates such as trimethyl phosphate, triethyl phosphate and mixtures thereof.

The organic solvent (S) is more preferably selected from ketones, amides, polar aprotic solvents comprising oxygen and/or nitrogen heteroatom(s) and mixtures thereof.

Should one or more organic solvents (S) be present, the weight ratio between the polymer (F) and the sum of the polymer (F) and the organic solvent (S) is typically comprised between 0.01 and 0.9, preferably between 0.05 and 0.5, more preferably between 0.08 and 0.25.

The upper limit of the solvent (S) content is not particularly limited, being nevertheless understood that, after the heating step (iii), which has the effects of drying and curing the film, the amount of one or more organic solvents (S), if any, which is stably incorporated and retained in the fluoropolymer film will be of at most 10% by weight, preferably of at most 5% by weight, more preferably of at most 1% by weight, even more preferably of at most 0.2% by weight based on the weight of polymer (F).

Generally, in the step (i) of the process of the invention one or more electrolytic salts (ES) are dissolved in the liquid medium so as to provide an electrolyte solution wherein the concentration of the electrolyte is of advantageously at least 0.01 M, preferably at least 0.025 M, more preferably at least 0.05 M and of at most 2 M, preferably 1.3 M, more preferably 0.8 M.

According to an embodiment of the invention, the mixture of step (i) of the process of the invention can further comprise at least one inorganic filler (I).

The addition of such inorganic filler (I) will provide advantageously fluoropolymer films having improved mechanical properties.

The inorganic filler (I) is generally provided in the mixture under the form of particles.

The inorganic filler (I) particles generally have an average particles size of 0.001 μm to 1000 μm, preferably of 0.01 μm to 800 μm, more preferably of 0.03 μm to 500 μm. The organic filler could have different shape factors such as flakes or fibers.

Among inorganic fillers (I) suitable for being used in the process of the invention, mention can be made of inorganic oxides, including mixed oxides, metal sulphates, metal carbonates, metal sulfides and the like.

Among metal oxides, mention can be made of $SiO_2$, $TiO_2$, ZnO and $Al_2O_3$.

A class of compounds which gave particularly good results within the context of this embodiment of the present invention are notably silicates, aluminium-silicates and magnesium silicates, all optionally containing additional metals such as sodium, potassium, iron or lithium.

These silicates, aluminium-silicates and magnesium silicates are generally known as possessing a layered structure.

These silicates, aluminium-silicates and magnesium silicates, all optionally containing additional metals such as sodium, potassium, iron or lithium can be notably smectic clays, possibly of natural origin, such as notably montmorillonites, sauconite, vermiculite, hectorite, saponite, nontronite. As an alternative, silicates, aluminium-silicates and magnesium silicates, all optionally containing additional metals such as sodium, potassium, iron or lithium can be selected among synthetic clays, like notably fluorohectorite, hectorite, laponite.

According to this embodiment, the fluoropolymer film obtained by the process of the present invention will comprise said inorganic fillers (I).

The process of the invention comprises a step (ii) of processing a film from the liquid mixture obtained in step (i).

Techniques for processing a film from a liquid mixture are known in the art; the liquid mixture of step (i) is typically processed by casting.

Should the liquid mixture be processed by casting, it is typically applied by spreading on a support surface using standard devices, according to well-known techniques like doctor blade coating, metering rod (or Meyer rod) coating, slot die coating, knife over roll coating or "gap coating", and the like.

The choice of the support surface is not particularly limited, being understood that the fluoropolymer film can be manufactured directly as an unitary assembly or can be manufactured by casting onto another support surface, from which said fluoropolymer film can be detached and individualized.

The process of the invention finally comprises a step (iii) of heating the film obtained in step (ii) for obtaining the fluoropolymer film.

Prior to the heating step (iii), the film can be dried to remove any residual solvent, optionally at a temperature lower than that of step (iii).

Drying can be performed under modified atmosphere, e.g. under an inert gas, typically exempt notably from moisture (water vapour content of less than 0.001% v/v), or can be performed under vacuum.

Further, drying prior to step (iii) can be performed at room temperature (about 25° C.) or at a temperature exceeding 25° C., this latter condition being generally preferred.

Drying temperature will be selected so as to effect removal by evaporation of one or more organic solvents (S), if any.

Also, the heating step (iii) can be performed at temperatures comprised between 100° C. and 250° C., preferably between 120° C. and 200° C.

Preferably, the heating step (iii) is carried out for at least 5 minutes, more preferably for at least 10 or 20 minutes.

The fluoropolymer film of the invention that comprises at least one electrolytic salt (ES) as defined above can be advantageously used as polymer electrolyte separator in electrochemical and photo-electrochemical devices.

In one embodiment, the present invention provides a fluoropolymer film which is obtainable by the process as defined above.

In an embodiment, the present invention provides a fluoropolymer film optically transparent to solar radiation comprising a fluoropolymer composite comprising:
at least one fluoropolymer [polymer (F)] having an intrinsic viscosity higher than 1.5 dl/g;
at least one liquid medium (LM) comprising at least one ionic liquid (IL) and containing at least one electrolytic salt (ES), wherein (F), (LM), (IL) and (ES) have the meaning as defined above.

Preferably, the polymer (F) has an intrinsic viscosity higher than 2.0 dl/g even more preferably higher than 2.5 dl/g.

The amount of the liquid medium in the fluoropolymer film is typically at least 25%, preferably at least 45% even more preferably at least 60% in volume over the total volume of the composition.

The typical maximum volume percentage of the liquid medium in the fluoropolymer film is 95%, preferably 90%, more preferably 80% in volume over the total volume of the composition.

In an aspect, the present invention provides an electrochemical device comprising the film as described above.

Non-limitative examples of suitable electrochemical devices include, notably, secondary batteries, especially lithium batteries (including those based on lithium metal and those based on intercalated compounds such as graphite) and lithium-sulfur batteries, and capacitors, especially lithium-ion capacitors.

Among preferred electrolytic salts (ES) for the fluoropolymer film for use in lithium-ion batteries mention can be made of $LiPF_6$, $LiBF_4$, $LiClO_4$, lithium bis(oxalato)borate ("LiBOB"), $LiN(CF_3SO_2)_2$, $LiN(C_2F_5SO_2)_2$, $M[N(CF_3SO_2)(R_FSO_2)]_n$ with $R_F$ being $C_2F_5$, $C_4F_9$, $CF_3OCF_2CF_2$, $LiAsF_6$, $LiC(CF_3SO_2)_3$, $Li_2Sn$ and combinations thereof.

The invention further pertains to a metal-ion secondary battery comprising as polymer electrolyte separator the fluoropolymer film as defined above, said fluoropolymer film comprising at least one electrolytic salt (ES) as defined above.

The metal-ion secondary battery is generally formed by assembling a positive electrode (cathode), the fluoropolymer film as defined above and a negative electrode (anode).

The metal-ion secondary battery is preferably a Na, Li, Al, Mg, Zn, K or Y secondary battery.

Representative anode (negative electrodes) materials of alkaline or alkaline-earth secondary batteries include:
graphitic carbons able to intercalate alkaline or alkaline-earth metal, typically existing in forms such as powders, flakes, fibers or spheres (for example, mesocarbon microbeads) hosting at least one alkaline or alkaline-earth metal;
alkaline or alkaline-earth metal;
alkaline or alkaline-earth metal alloy compositions, including silicon-based alloys, germanium-based alloys;
alkaline or alkaline-earth metal titanates, advantageously suitable for intercalating alkaline or alkaline-earth metal with no induced strain.

The metal-ion secondary battery is more preferably a lithium-ion secondary battery, wherein the negative electrode material is selected from the group consisting of:
graphitic carbons able to intercalate lithium, typically existing in forms such as powders, flakes, fibers or spheres (for example, mesocarbon microbeads) hosting lithium;
lithium metal;

lithium alloy compositions, including notably those described in U.S. Pat. No. 6,203,944 (3M INNOVATIVE PROPERTIES CO.) Mar. 20, 2001 and/or in WO 00/03444 (MINNESOTA MINING AND MANUFACTURING) Jun. 10, 2005;

lithium titanates, generally represented by formula $Li_4Ti_5O_{12}$; these compounds are generally considered as "zero-strain" insertion materials, having low level of physical expansion upon taking up the mobile ions, i.e. $Li^+$;

lithium-silicon alloys, generally known as lithium silicides with high Li/Si ratios, in particular lithium silicides of formula $Li_{4.4}Si$;

lithium-germanium alloys, including crystalline phases of formula $Li_{4.4}Ge$.

The negative electrode (anode) may contain additives as will be familiar to those skilled in the art. Among them, mention can be made notably of carbon black, graphene or carbon nanotubes. As will be appreciated by those skilled in the art, the negative electrode or cathode may be in any convenient form including foils, plates, rods, pastes or as a composite made by forming a coating of the negative electrode material on a conductive current collector or other suitable support.

Preferably the anode is lithium metal.

Representative cathode (positive electrodes) materials of alkaline or alkaline-earth secondary batteries include composites comprising a polymer binder (PB), a powdery electrode material and, optionally, an electroconductivity-imparting additive and/or a viscosity modifying agent.

In the case of forming a positive electrode for a lithium ion battery, the active substance may comprise a composite metal chalcogenide represented by a general formula of $LiMY_2$, wherein M denotes at least one species of transition metals such as Co, Ni, Fe, Mn, Cr and V; and Y denotes a chalcogen, such as O or S. Among these, it is preferred to use a lithium-based composite metal oxide represented by a general formula of $LiMO_2$, wherein M is the same as above. Preferred examples thereof may include: $LiCoO_2$, $LiNiO_2$, $LiNi_xCo_{1-x}O_2$ (0<x<1), and spinel-structured $LiMn_2O_4$. An electroconductivity-imparting additive may be added in order to improve the conductivity of a resultant composite electrode, particularly in case of using an active substance, such as $LiCoO_2$, showing a limited electron-conductivity. Examples thereof may include: carbonaceous materials, such as carbon black, graphite fine powder and fiber, and fine powder and fiber of metals, such as nickel and aluminum.

As per the polymer binder (PB), polymers well known in the art can be used including, preferably, vinylidene fluoride (VDF) polymers and even more particularly, VDF polymers comprising recurring units derived from VDF and from 0.01% to 5% by moles of recurring units derived from at least one (meth)acrylic monomer (MA) of formula (I) as defined above.

The invention also pertains to a metal-ion capacitor comprising as polymer electrolyte separator the fluoropolymer film as defined above, said fluoropolymer film comprising at least one electrolytic salt (ES) as defined above.

The metal-ion capacitor is preferably a lithium-ion capacitor.

Non-limitative examples of suitable photo-electrochemical devices include, notably, dye-sensitized solar cells, photochromic devices and electrochromic devices.

The invention further pertains to a dye-sensitized solar cell comprising as polymer electrolyte separator the fluoropolymer film of the invention, said fluoropolymer film comprising at least one electrolytic salt (ES) as defined above.

The dye-sensitized solar cell is generally formed by assembling a metal support to which there is applied a metal oxide semiconductor layer, such as a $TiO_2$ semiconductor layer, said metal oxide semiconductor layer being coated with a dye layer, the fluoropolymer film as defined above and a conductive electrode.

Non-limitative examples of suitable dyes include, notably, ruthenium and osmium-based dyes such as ruthenium tris (2,2'-bipyridyl-4,4'-dicarboxylate), ruthenium cis-diaqua bipyridyl complexes such as ruthenium cis diaqua bis (2,2'-bipyridyl-4,4'-dicarboxylate), porphyrins such as zinc tetra (4-carboxyphenyl) porphyrin, cyanides such as iron-hexacyanide complexes and phthalocyanines.

The dye-sensitized solar cell is typically closed at the top and at the bottom by an insulating layer, wherein the conductive electrode and the insulated layer on the top of the cell must be optically transparent to the solar radiation.

Among preferred electrolytic salts (ES) for the fluoropolymer film for use in dye-sensitized solar cells mention can be made of redox electrolytes such as iodide/triiodide couples and disulfide/thiolate couples.

The invention further pertains to a photochromic device comprising as polymer electrolyte separator the fluoropolymer film of the invention, said fluoropolymer film comprising at least one electrolytic salt (ES) as defined above.

The photochromic device is generally formed by assembling a first conducting electrode opposing a second conducting electrode, wherein at least one of said conducting electrodes is optically transparent to solar radiation, a radiation sensitive electrode disposed on an opposing surface of said first conducting electrode, an ion intercalative electrode disposed on an opposing surface of said second conducting electrode and the fluoropolymer film as defined above, said fluoropolymer film being disposed between said radiation sensitive electrode and said ion intercalative electrode.

Among preferred electrolytic salts (ES) for the fluoropolymer film for use in photochromic devices mention can be made of metal salts such as lithium, sodium potassium, rubidium, silver and cesium salts, preferably $LiClO_4$, $Li(CF_3SO_3)$ and lithium iodide.

Non-limitative examples of suitable radiation sensitive electrodes include, notably, semiconductors such as II-VI, III-V and II-V elemental and compound semiconductors and transition metal compounds, preferably metal oxides, metal sulfides and metal selenides.

The radiation sensitive electrode may further comprise organic or inorganic dyes which absorb at least a part of solar radiation.

Non-limitative examples of suitable ion intercalative electrodes include, notably, those comprised of inorganic materials, organic materials or blends and composites of inorganic and organic ion intercalatable materials, preferably those comprised of $WO_3$ or $MoO_3$ or their alkali metal (e.g., Li, K, Na, Rb or Cs) tungstates or molybdates, optionally containing up to 30% by moles of transition metals (e.g., Ti, Cr, V, Mn, Co and the like).

The invention further pertains to an electrochromic device comprising as polymer electrolyte separator the fluoropolymer film of the invention, said fluoropolymer film comprising at least one electrolytic salt (ES) as defined above.

The electrochromic device is generally formed by assembling a conducting electrode opposing a counter electrode wherein an electrochemically active material layer, a selective ion transport layer and the fluoropolymer film as defined above are sequentially disposed between said conducting electrode and said counter conducting electrode. At least one of the electrodes is optically transparent to solar radiation.

Among preferred electrolytic salts (ES) for the fluoropolymer film for use in electrochromic devices mention can be made of metal salts such as lithium, sodium, potassium, rubidium, silver and cesium salts, preferably $LiClO_4$, $LiBF_4$, $LiCF_3SO_3$, $LiN(CF_3SO_2)_2$ and lithium iodide.

Non-limitative examples of suitable electrochemically active material layers include, notably, inorganic, organic or blends and composites of inorganic and organic electrochemically active materials, preferably polyaniline and its derivatives, $WO_3$, $MoO_3$ and $WO_3$ and $MoO_3$ doped with oxides of lithium, sodium, potassium, molybdenum, vanadium or titanium.

Non-limitative examples of suitable selective ion transport layers include, notably, those preventing the oxidized species in the polymer electrolyte separator from contacting reduced electrochemical material layer.

Should the fluoropolymer film of the invention comprise a liquid medium comprising at least one protic ionic liquid ($IL_p$), it can be advantageously used as polymer separator in fuel cell devices.

The invention further pertains to a fuel cell device comprising as polymer separator the fluoropolymer film of the invention, said fluoropolymer film comprising a liquid medium comprising at least one protic ionic liquid ($IL_p$).

Should the disclosure of any patents, patent applications, and publications which are incorporated herein by reference conflict with the description of the present application to the extent that it may render a term unclear, the present description shall take precedence.

The invention will be now described with reference to the following examples whose purpose is merely illustrative and not limitative of the present invention.

Raw Materials

Fluoropolymer A, a PVDF homopolymer having an intrinsic viscosity of 3.0 dl/g at 25° C. in DMF.

Fluoropolymer B, PVDF co-polymer containing about 0.8% moles of acrylic acid based on the total number of moles in the fluoropolymer and having an intrinsic viscosity of 2.9 dl/g at 25° C. in DMF.

Fluoropolymer C (comparative), a PVDF homopolymer having an intrinsic viscosity of 0.9 dl/g at 25° C. in DMF.

N-Propyl-N-methylpyrrolidinium bis(trifluoromethanesulfonyl)imide (Pyr13TFSI) [ionic liquid (IL-1)] of formula:

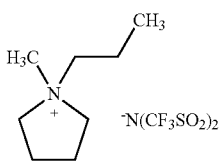

Lithium bis(trifluoromethanesulfonyl)imide (LiTFSI) [electrolytic salt (ES-1)].

Measurement of the Ionic Conductivity (σ)

The solid electrolyte separator is placed in a ½ inch stainless steel Swagelok-cell prototype. The resistance of the solid polymer electrolyte separator was measured and the ionic conductivity (σ) was obtained using the following equation:

$$\sigma = d/(R_b \cdot Surf)$$

wherein d is the thickness of the film, $R_b$ the bulk resistance and Surf is the area of the stainless steel electrode.

Determination of Intrinsic Viscosity of Polymer (F) (DMF at 25° C.)

Intrinsic viscosity [η] (dl/g) was determined using the following equation on the basis of the dropping time, at 25° C., of a solution obtained by dissolving polymer (F) in dimethylformamide at a concentration of about 0.2 g/dl, in an Ubbelhode viscosimeter $$[\eta] = \frac{\eta_{sp} + \Gamma \cdot \ln \eta_r}{(1 + \Gamma) \cdot c}$$

where c is polymer concentration in g/dl;
$\eta r$ is the relative viscosity, i.e. the ratio between the dropping time of sample solution and the dropping time of solvent;
$\eta_{sp}$ is the specific viscosity, i.e. $\eta_r - 1$; $\Gamma$ is an experimental factor, which for polymer (F) corresponds to 3.

Measurement of Tensile Properties of the Film

The tensile properties were measured by tensile testing at 23° C. according to ASTM D638 standard test method (specimen of type V, grip distance=25.4 mm, Lo=21.5 mm, 1-50 mm/min).

Measurement of the Haze of the Film

The haze of the film has been measured in air following the standard procedure of ASTM E313.

General Procedure of Manufacturing of the Fluoropolymer Film with a Polymer (F).

The dissolution of polymer (F) (1.5 g) was carried out in Cyclohexanone/DMSO (80/20 wt %) (28.5 g) (5% by weight) during 4 h at 60° C.

An electrolyte solution (liquid medium) was formed by the mixture of the electrolytic salt (ES-1) and the ionic liquid (IL-1) with the following relative amount: 0.5 M of LiTFSI in Pyr13TFSI. The electrolyte solution so obtained had an ionic conductivity of $2.4 \times 10^{-3}$ S/cm at 25° C.

The electrolyte solution (1 g) was added to the polymer (F) solution (8.5 g) and stirred during 10 minutes at room temperature. A mixture was obtained containing 25% by volume (30% by weight) of polymer (F) and 75% by volume (70% by weight) of the electrolyte solution. The mixture was casted at room temperature and dried at 50° C. Then the heating stage was done for a given time and temperature to carry out the curing of the resulting film.

Example 1

The fluoropolymer film was made according to the general procedure described above in which polymer A was used and the curing step was at 150° C. for 40 minutes.

The fluoropolymer film so obtained is transparent and homogeneous in absence of defects. The tensile properties are in Table 1, the ionic conductivity is presented in Table 2 and the haze results in Table 3.

Example 2

The fluoropolymer film was made according to the general procedure described above in which Polymer B was used and the curing step was carried out at 150° C. for 40 minutes.

The fluoropolymer film so obtained is transparent and homogeneous in absence of defects.

The fluoropolymer film so obtained is transparent and homogeneous in absence of defects. The tensile properties are in Table 1 and the ionic conductivity is presented in Table 2.

Comparative Example 1

The fluoropolymer film was made according to the general procedure described above in which Polymer C was used and the curing step was carried out at 150° C. for 40 min.

The fluoropolymer film so obtained is transparent but too fragile to measure the ionic conductivity. Its scarce tensile properties are shown in Table 1.

Comparative Example 2

The fluoropolymer film was made according to the general procedure described above in which Polymer A was used and the curing was done at 70° C. for 48 h. The fluoropolymer film so obtained is white and heterogeneous. The haze of this film is superior to 40 (see table 3).

TABLE 1

| Example | Thickness [mm] | Yield Stress [MPa] | Yield Strain [%] | Stress @ Break [MPa] | Strain @ Break [%] |
| --- | --- | --- | --- | --- | --- |
| Comp 1 | 0.0238 | 4.1 | 15.6 | 6.1 | 65 |
| Comp 2 | 0.0892 | 1.1 | 16.5 | 2.4 | 261 |
| 1 | 0.0705 | 5.9 | 21.9 | 17.0 | 278 |

TABLE 2

| Example | Thickness [mm] | Ionic conductivity [S/cm] |
| --- | --- | --- |
| 1 | 0.03 | $4.5 \times 10^{-4}$ |
| 2 | 0.03 | $7.5 \times 10^{-4}$ |

TABLE 4

| Example | Thickness [mm] | Haze | Aspect |
| --- | --- | --- | --- |
| 1 | 0.015 | 18.1 ± 0.1 | Transparent |
| Comp. 2 | 0.044 | 68.1 ± 0.3 | Opaque |

It can be concluded that only the combination according to the invention of a polymer (F) having high intrinsic viscosity associated with a heating after formation (post-curing) of the film at high temperature (>100° C.) provides a film with satisfactory results.

Example 3

The fluoropolymer film of example 1 was tested as ionic conductive separator in the following battery: LFP/Fluoropolymer film/Li metal. The film thickness was 30 microns.
LFP (Positive Electrode):
82% LiFePO$_4$/10% super C65®/8% SOLEF® 5130 PVDF, loading=0.6 mAh/cm$^2$
Super 065®=carbon powder supplied by Imerys
Manufacture of the Battery The membrane was dried at 55° C. under vacuum during one night before being used in the battery.

The positive electrode was dried during one night under vacuum at 130° C. The electrodes and the membrane were put in argon environment (no oxygen or humidity). Two drops of ES was added to the positive electrode The membrane was then placed between the positive electrode and the lithium metal in a coin cell and it was tested at 60° C. The discharge capacity values of the coin cell so obtained at different discharge rates are set forth in Table 4 here below.

Example 4

As in example 3 but using the film of example 2. Results are reported in Table 5

TABLE 5

| C-Rate | | Average Discharge [mAh/g] | [%] |
| --- | --- | --- | --- |
| 0.05 | Discharge D/20 | 155 | 100 |
| 0.1 | Discharge D/10 | 147 | 95 |
| 0.2 | Discharge D/5 | 145 | 94 |
| 0.5 | Discharge D/2 | 140 | 90 |
| 1 | Discharge D | 108 | 70 |

The invention claimed is:

1. A process for manufacturing a fluoropolymer film comprising a fluoropolymer composite, said process comprising:
   processing a mixture to obtain a film, wherein the mixture is a mixture of:
   at least one fluoropolymer having an intrinsic viscosity higher than 1.5 dl/g, wherein the intrinsic viscosity is measured in DMF at 25° C.;
   at least one liquid medium (LM) containing at least one ionic liquid (IL) and containing at least one electrolytic salt (ES) and, optionally at least one organic solvent (S);
   and
   heating the film obtained at a temperature between 120° C. and 200° C. to obtain a transparent film;
   wherein the film obtained has an elongation at break of at least of 200% and a stress at break of at least 15 MPa.

2. The process according to claim 1, wherein polymer (F) has intrinsic viscosity higher than 2.0 dl/g, wherein the intrinsic viscosity is measured in DMF at 25° C.

3. The process according to claim 2, wherein polymer (F) has intrinsic viscosity higher than 2.5 dl/g, wherein the intrinsic viscosity is measured in DMF at 25° C.

4. The process according to claim 1, wherein heating the film is carried out for not less than 5 minutes.

5. The process according to claim 1, wherein the ionic liquid (IL) is selected from those comprising a cation selected from a sulfonium ion or an imidazolium, pyridinium, pyrrolidinium or piperidinium ring, said ring being optionally substituted on the nitrogen atom and on the carbon atoms, and comprising an anion selected from halides anions, perfluorinated anions and borates.

6. The process according to claim 5, wherein said ring is substituted on the nitrogen atom by one or more alkyl groups with 1 to 8 carbon atoms, on the carbon atoms by one or more alkyl groups with 1 to 30 carbon atoms, or on both.

7. The process according to claim 1, wherein the electrolytic salt (ES) is selected from LiI, LiPF$_6$, LiBF$_4$, LiClO$_4$, lithium bis(oxalato)borate ("LiBOB"), LiCF$_3$SO$_3$, LiN(CF$_2$SO$_2$)$_2$, LiN(C$_2$F$_5$SO$_2$)$_2$, M [N(CF$_3$SO$_2$)(R$_F$SO$_2$)]$_n$ with R$_F$ being C$_2$F$_5$, C$_4$F$_9$, or CF$_3$OCF$_2$CF$_2$, LiAsF$_6$, LiC(CF$_3$SO$_2$)$_3$, Li$_2$S$_n$, and combinations thereof.

8. The process according to claim 1, wherein the liquid medium (LM) comprises an organic solvent (S) selected from the group consisting of ketones; polar aprotic solvents comprising oxygen and/or nitrogen heteroatom(s); organic phosphates and mixtures thereof.

9. The process according to claim 8, wherein the liquid medium (LM) comprises an organic solvent (S) selected from the group consisting of acetone, methylethylketone, isophorone, methyl isobutyl ketone (MIK), cyclohexanone, diisobutyl ketone, N,N-dimethylformamide (DMF), N,N dimethyl acetamide, tetramethyl urea, dimethylsulfoxide (DMSO), tetrahydrofuran (THF), N-methyl-2-pyrrolidone (NMP), trimethyl phosphate, triethyl phosphate and mixtures thereof.

10. The process according to claim 1, wherein:
the ionic liquid (IL) is selected from those comprising a cation selected from a sulfonium ion or an imidazolium, pyridinium, pyrrolidinium or piperidinium ring, said ring being optionally substituted on the nitrogen atom and on the carbon atoms, and comprising an anion selected from halides anions, perfluorinated anions and borates;
the electrolytic salt (ES) is selected from LiI, $LiPF_6$, $LiBF_4$, $LiClO_4$, lithium bis(oxalato)borate ("LiBOB"), $LiCF_3SO_3$, $LiN(CF_2SO_2)_2$, $LiN(C_2F_5SO_2)_2$, $M[N(CF_3SO_2)(R_FSO_2)]_n$, with $R_F$ being $C_2F_5$, $C_4F_9$, or $CF_3OCF_2CF_2$, $LiAsF_6$, $LiC(CF_3SO_2)_3$, $Li_2S_n$, and combinations thereof; and
the liquid medium (LM) comprises an organic solvent (S) selected from the group consisting of ketones; amides; polar aprotic solvents comprising oxygen and/or nitrogen heteroatom (s); organic phosphates and mixtures thereof.

11. The process according to claim 10, wherein:
in the ionic liquid (IL), said ring is substituted on the nitrogen atom by one or more alkyl groups with 1 to 8 carbon atoms, on the carbon atoms by one or more alkyl groups with 1 to 30 carbon atoms, or on both; and
the liquid medium (LM) comprises an organic solvent (S) selected from the group consisting of acetone, methylethylketone, isophorone, methyl isobutyl ketone (MIK), cyclohexanone diisobutyl ketone, N,N-dimethylformamide (DMF), N,N-dimethylacetamide, tetramethyl urea, dimethylsulfoxide (DMSO), tetrahydrofuran (THF), N-methyl-2-pyrrolidone (NMP), trimethyl phosphate, triethyl phosphate and mixtures thereof.

12. A fluoropolymer film which is obtainable by the process of claim 1.

* * * * *